(12) United States Patent
Lee

(10) Patent No.: US 9,254,709 B2
(45) Date of Patent: Feb. 9, 2016

(54) ADHESIVE DECORATIVE PATTERN WITH PLIABLE POLYMER FILM AND METHOD OF MAKING THEROF

(71) Applicant: JAH YIH ENTERPRISE CO., LTD., Taichung (TW)

(72) Inventor: Chi-Shih Lee, Taichung (TW)

(73) Assignee: Jah Yih Enterprise Co., Ltd., Taichung (TW)

( * ) Notice: Subject to any disclaimer, the term of this patent is extended or adjusted under 35 U.S.C. 154(b) by 90 days.

(21) Appl. No.: 14/157,570

(22) Filed: Jan. 17, 2014

(65) Prior Publication Data

US 2015/0202915 A1 Jul. 23, 2015

(51) Int. Cl.
| | |
|---|---|
| B29C 65/02 | (2006.01) |
| B29C 65/18 | (2006.01) |
| B32B 27/04 | (2006.01) |
| B32B 27/12 | (2006.01) |
| B32B 37/04 | (2006.01) |
| B32B 37/12 | (2006.01) |
| B32B 37/26 | (2006.01) |
| B32B 38/10 | (2006.01) |
| B32B 43/00 | (2006.01) |
| C08J 5/12 | (2006.01) |
| C09J 5/00 | (2006.01) |
| B44C 1/10 | (2006.01) |
| B32B 37/18 | (2006.01) |
| B32B 5/02 | (2006.01) |
| A43B 3/00 | (2006.01) |
| B44C 3/02 | (2006.01) |

(52) U.S. Cl.
CPC ................ *B44C 1/105* (2013.01); *A43B 3/0078* (2013.01); *B32B 5/02* (2013.01); *B32B 37/182* (2013.01); *B44C 3/02* (2013.01); *B32B 2037/268* (2013.01); *B32B 2305/188* (2013.01); *B32B 2437/02* (2013.01); *B32B 2451/00* (2013.01)

(58) Field of Classification Search
USPC .............. 156/230, 231, 238, 247, 289, 307.1, 156/307.3, 308.2, 309.6; 428/221, 297.4, 428/297.7, 300.7, 542.2, 542.6
See application file for complete search history.

(56) References Cited

U.S. PATENT DOCUMENTS

| | | | |
|---|---|---|---|
| 4,503,114 A | | 3/1985 | Cohen |
| 4,590,027 A | * | 5/1986 | Murphy et al. ................ 264/135 |
| 4,885,037 A | * | 12/1989 | Ohkubo .......................... 156/57 |
| 7,691,470 B2 | * | 4/2010 | Goodson et al. ............. 428/212 |
| 2012/0328849 A1 | * | 12/2012 | Neill et al. ................. 428/195.1 |
| 2013/0224459 A1 | | 8/2013 | Lee |

FOREIGN PATENT DOCUMENTS

GB 2151546 1/1986

\* cited by examiner

*Primary Examiner* — Sing P Chan
(74) *Attorney, Agent, or Firm* — Alan D. Kamrath; Kamrath IP Lawfirm, P.A.

(57) ABSTRACT

An adhesive decorative pattern with a pliable polymer film includes first and second pliable polymer films, a first decorative element made out of fabric and consisting of a plurality of fabrics each extending in irregular directions, and a releasing paper defining a front releasably coated with a glue layer. The first pliable polymer film, the first decorative element, the second pliable polymer film, and the releasing paper are stacked together into a pile. The first decorative element is sandwiched between the first and second pliable polymer films. The glue layer is sandwiched between the second pliable polymer and the front of the releasing paper. The adhesive decorative pattern with the pliable film includes the first pliable polymer film, the first decorative element, and the second pliable polymer film bonded securely together, and includes the releasing paper being able to be released from the glue layer.

4 Claims, 6 Drawing Sheets preparing materials including first and second pliable polymer films, a decorative element, and a releasing paper coated with a glue layer.

stacking the materials together into a pile.

hot-pressing the pile.

ADHESIVE DECORATIVE PATTERN WITH PLIABLE POLYMER FILM AND METHOD OF MAKING THEROF

BACKGROUND OF THE INVENTION

1. Field of the Invention

The present invention relates to a decorative pattern and, more particularly, to an adhesive decorative pattern with a pliable polymer film and a method of making thereof.

2. Description of the Related Art

U.S. Patent Publication No. 2013/0224459 A1 shows a decorative element with a thermoplastic polyurethane (abbreviated TPU) film, but it can't withstand tensile forces in different directions and will suffer a problem that its decoration design becomes out of portion. Since the decoration design is patterned with lines that are parallel to one another, it can only be subject to a unidirectional tensile force that acts parallel to the lines.

The present invention is, therefore, intended to obviate or at least alleviate the problems encountered in the prior art.

SUMMARY OF THE INVENTION

According to the present invention, an adhesive decorative pattern with a pliable polymer film includes first and second pliable polymer films, first decorative element made out of fabric and consisting of a plurality of fabrics each extending in irregular directions, and a releasing paper defining a front releasably coated with a glue layer. The first pliable polymer film, the first decorative element, the second pliable polymer film, and the releasing paper are stacked together into a pile. The first decorative element is sandwiched between the first and second pliable polymer films. The glue layer is sandwiched between the second pliable polymer and the front of the releasing paper. The adhesive decorative pattern with a pliable film includes the first pliable polymer film, the first decorative element, and the second pliable polymer film bonded securely together, and includes the releasing paper being able to released from the glue layer.

A method of producing the adhesive decorative pattern with a pliable polymer film includes preparing the first and second pliable polymer films, the first decorative element, and the releasing paper; stacking the first pliable polymer film, the first decorative element, the second pliable polymer film, and the releasing paper together into a pile, with the first decorative element sandwiched between the first and second pliable polymer films, with the glue layer sandwiched between the second pliable polymer and the front of the releasing paper; and hot pressing the pile to bond the first pliable polymer film, the first decorative element, and the second pliable polymer film securely together, and to allow the releasing paper to be able to released from the glue layer.

It is therefore an object of the present invention to provide an adhesive decorative pattern with a pliable polymer film that has a good tensile strength and can withstand tensile forces in different directions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objects, advantages, and new features of the present invention will become apparent from the following detailed description of the invention when considered in conjunction with the accompanied drawings.

DETAILED DESCRIPTION OF THE PREFERRED EMBODIMENTS

Figure 1:
FIG. 1 is a flow chart of a method for producing an adhesive decorative pattern with a pliable polymer film in accordance with the present invention.
Figure 1:
Figure 2A:
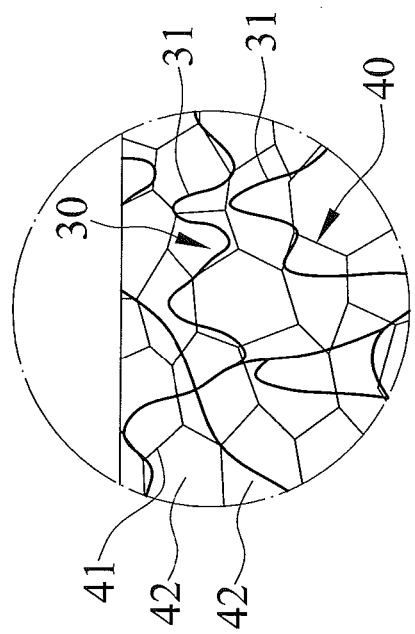
FIG. 2A is an enlarged view of a portion of FIG. 2.
Figure 2:
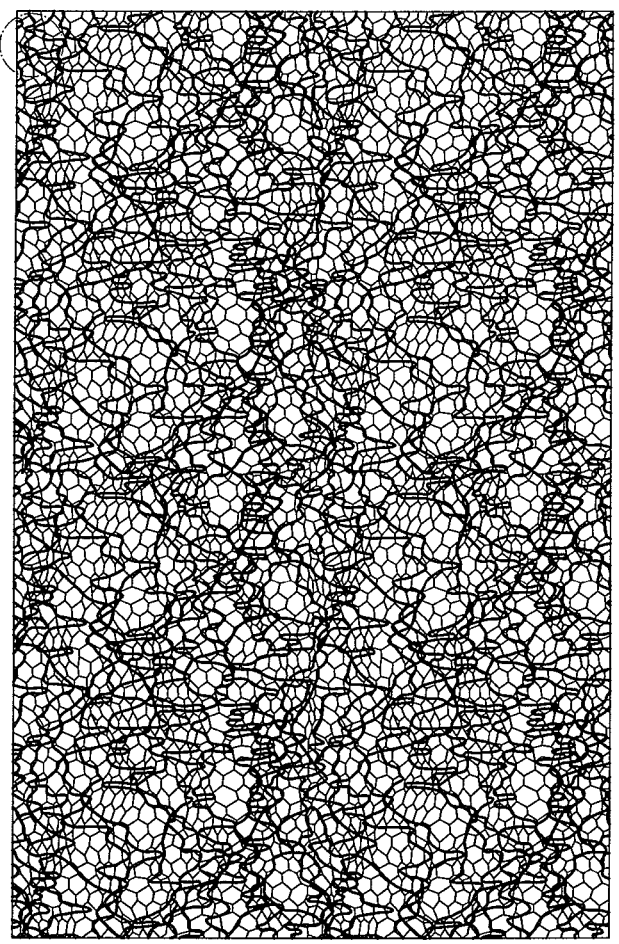
FIG. 2 is a top view of an adhesive decorative pattern with a pliable polymer film in accordance with the present invention.
Figure 3:
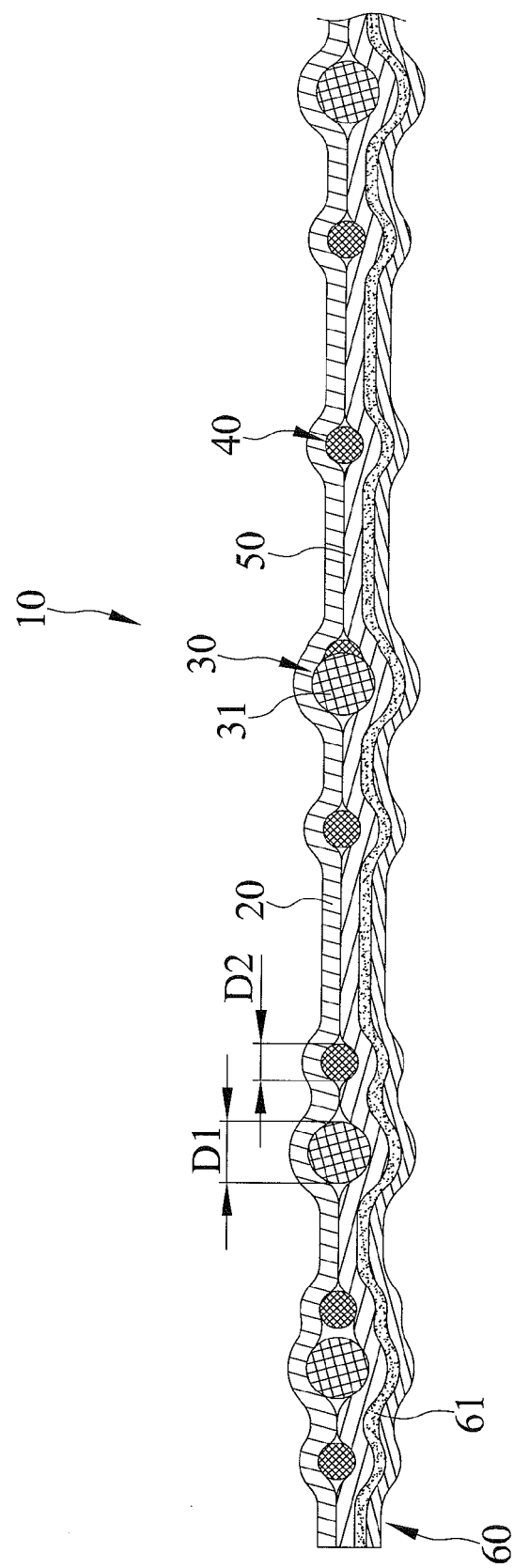
FIG. 3 is a cross-section view of the adhesive decorative pattern with pliable polymer film of FIG. 2.
Figure 4:
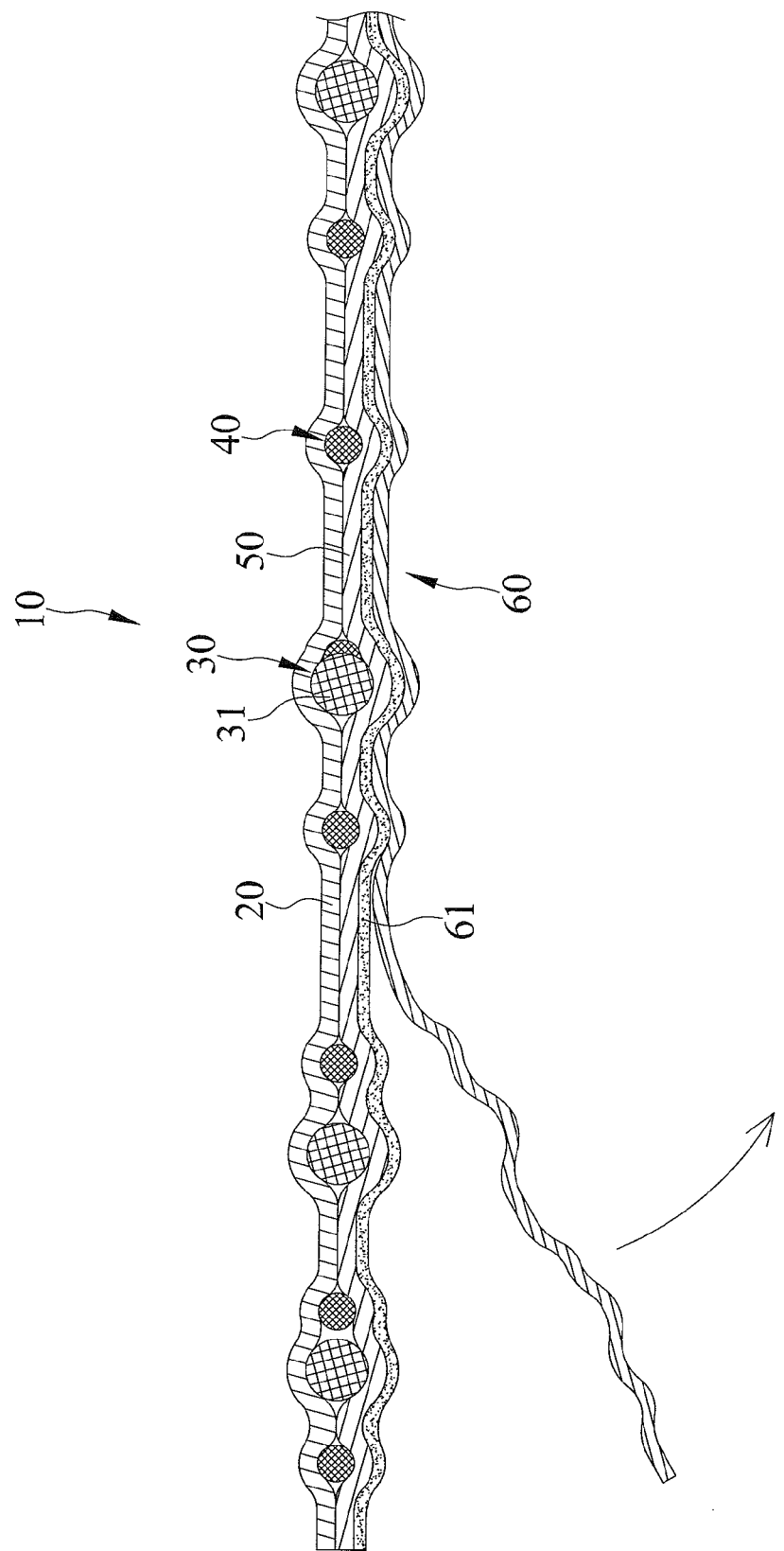
FIG. 4 is a cross-section view showing a releasing film is removed from a back of the adhesive decorative pattern with the pliable polymer film.

An adhesive decorative pattern with a pliable polymer film 10 includes first and second pliable polymer films 20 and 50, a first decorative element 30, and a releasing paper 60. The first and second pliable polymer films 20 and 50 are transparent and pervious to light. The material of the first and second pliable polymer films 20 and 50 is thermoplastic polyurethane (abbreviated TPU), thermoplastic elastomer (abbreviated TPE), thermoplastic polyolefin (abbreviated TPO), ethylene vinyl acetate (abbreviated EVA), or polypropylene (abbreviated PP). In the embodiment, the first and second pliable polymer films 20 and 50 are TPU films. The first decorative element 30 is made out of fabric and consists of a plurality of fibers 31. Each of the plurality of fibers 31 extends in irregular directions, creating a good tensile strength and can withstand tensile forces in different directions. Moreover, each of the plurality of fibers 31 of the first decorative element 30 has a diametrical size D1. The releasing paper 60 defines a front releasably coated with a glue layer 61.

The first pliable polymer film 20, the first decorative element 30, the second pliable polymer film 50, and the releasing paper 60 are stacked together into a pile. The first decorative element 30 is sandwiched between the first and second pliable polymer films 20 and 50. The glue layer 61 is sandwiched between the second pliable polymer 50 and the front of the releasing paper 60. The adhesive decorative pattern with the pliable polymer film 10 includes the first pliable polymer film 20, the first decorative element 30, and the second pliable polymer film 50 bonded securely together, and includes the releasing paper 60 being able to be released from the glue layer 61.

Furthermore, the adhesive decorative pattern with the pliable polymer film 10 includes a second decorative element 40 sandwiched and bonded securely between the first and second pliable polymer films 20 and 50. The second decorative element 40 is made out of fabric and consists of a plurality of fibers 41 interweaved to include a plurality of meshes 42. Each of the plurality of fibers 41 of the second decorative element 40 has a second diametrical size D2. The second diametrical size D2 is smaller than the first diametrical size D1, but the present invention is not limited thereto. Each of the plurality of meshes 42 is polygonal. In the embodiment, each of the plurality of meshes is hexagonal.

The first decorative element 30 and the second decorative element 40 are made of cotton, but the present invention is not limited thereto.

In addition, a method of producing the adhesive decorative element with the pliable polymer film 10 includes preparing the first and second pliable polymer films 20 and 50, the first decorative element 30, and the releasing paper 60; stacking the first pliable polymer film 20, the first decorative element 30, the second pliable polymer film 50, and the releasing paper 60 together into a pile, with the first decorative element 30 sandwiched between the first and second pliable polymer films 20 and 50, with the glue layer 61 sandwiched between the second pliable polymer 50 and the front of the releasing paper 60; and hot pressing the pile to bond the first pliable polymer film 20, the first decorative element 30, and the second pliable polymer film 50 securely together, and to allow the releasing paper to be able to be released from the glue layer 61.

Furthermore, the adhesive decorative pattern with the pliable polymer film 10 includes preparing the second decorative element 40; arranging the pile to include the second decorative element 40 sandwiched between the first and second pliable polymer films 20 and 50; and hot pressing the first pliable polymer film 20, the first and second decorative elements 30 and 40, and the second pliable polymer film 50 securely together.

Figure 5:
FIG. 5 shows the adhesive decorative pattern with the pliable polymer film of FIG. 2 applicable on a pair of shoes.
Figure 6:
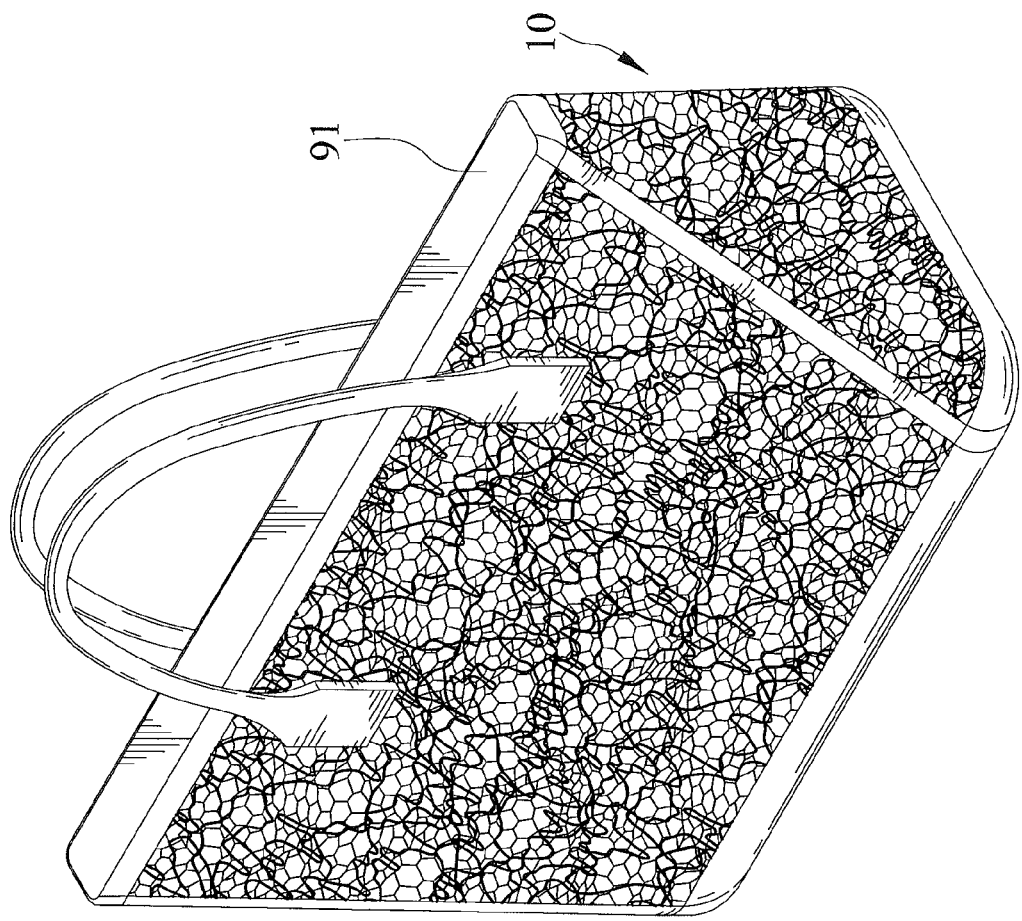
FIG. 6 shows the adhesive decorative pattern with the pliable polymer film of FIG. 2 applicable on a bag.

By peeling off the releasing paper 60 from the adhesive decorative pattern with the pliable polymer film 10, the first pliable polymer film 20, the first and second decorative elements 30 and 40, and the second pliable polymer film 50 can adhere to an object by the glue layer 60. FIGS. 5 and 6 respectively show the adhesive decorative pattern with the pliable polymer film 10 applicable on a pair of shoes 90 and a bag 91.

In view of the foregoing, each of the plurality of fibers 31 of the first decorative element 30 extends in an irregular direction. Furthermore, the second decorative element 40 is a mesh structure. Furthermore, the first and second decorative elements 30 and 40 are bonded between the first and second pliable polymer films 20 and 50. Furthermore, the plurality of fibers 31 of the first decorative element 30 extend extends across the plurality of fibers 41 of the second decorative element 40. Therefore, the adhesive decorative pattern with the pliable polymer film 10 has a good tensile strength and can withstand tensile forces in different directions. In addition, since the first pliable polymer film 20 is pervious to light, a person can see through it.

While the specific embodiments have been illustrated and described, numerous modifications come to mind without significantly departing from the spirit of invention, and the scope of invention is only limited by the scope of accompanying claims.

What is claimed is:

1. An adhesive decorative pattern with a pliable polymer film comprising:
    first and second pliable polymer films;
    a first decorative element made out of fabric and consisting of a plurality of fibers each extending in irregular directions;
    a second decorative element made out of fabric and consists of a plurality of fibers interweaved to a shape including a plurality of meshes; and
    a releasing paper defining a front releasably coated with a glue layer,
    wherein the first pliable polymer film, the first and second decorative elements, the second pliable polymer film, and the releasing paper are stacked together into a pile, with the first and second decorative elements sandwiched between the first and second pliable polymer films, with the glue layer sandwiched between the second pliable polymer and the front of the releasing paper, wherein the first pliable polymer film, the first and second decorative elements, and the second pliable polymer film bonded securely together, with the releasing paper releasable from the glue layer, wherein the plurality of fibers of the first decorative element and the plurality of fibers of the second decorative element are different from each other in diametrical size.

2. The adhesive decorative pattern with the pliable polymer film as claimed in claim 1, wherein the plurality of fibers of the first decorative element extends across the plurality of fibers of the second decorative element.

3. A method of producing an adhesive decorative pattern with a pliable polymer film comprising:
    preparing first and second pliable polymer films, a first decorative element made out of fabric and consisting of a plurality of fibers each extending in irregular directions, a second decorative element made out of fabric and consisting of a plurality of fabrics interweaved to include a plurality of meshes, and a releasing paper defining a front releasably coated with a glue layer;
    stacking the first pliable polymer film, the first and second decorative elements, the second pliable polymer film, and the releasing paper together into a pile, with the first and second decorative elements sandwiched between the first and second pliable polymer films, with the glue layer sandwiched between the second pliable polymer and the front of the releasing paper; and
    hot pressing the pile to bond the first pliable polymer film, the first and second decorative elements, and the second pliable polymer film securely together, with the releasing paper releasable from the glue layer, wherein the plurality of fibers of the first decorative element and the plurality of fibers of the second decorative element are different from each other in diametrical size.

4. The method as claimed in claim 3, wherein the plurality of fibers of the first decorative element extends across the plurality of fibers of the second decorative element.

\* \* \* \* \*